(12) United States Patent
Zaccardi et al.

(10) Patent No.: US 11,143,045 B2
(45) Date of Patent: Oct. 12, 2021

(54) INTERMEDIATE CASE FOR AN AIRCRAFT TURBOMACHINE MADE FROM A SINGLE CASTING WITH A LUBRICANT DUCT

(71) Applicant: Safran Aircraft Engines, Paris (FR)

(72) Inventors: Cédric Zaccardi, Saint Maur des Fosses (FR); Christophe Paul Jacquemard, Hericy (FR); Thierry Georges Paul Papin, Varennes-Jarcy (FR); Christophe Marcel Lucien Perdrigeon, Ballainvilliers (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 452 days.

(21) Appl. No.: 15/653,976

(22) Filed: Jul. 19, 2017

(65) Prior Publication Data

US 2018/0023406 A1    Jan. 25, 2018

(30) Foreign Application Priority Data

Jul. 20, 2016  (FR) ...................... 16 56904

(51) Int. Cl.
*F01D 9/06* (2006.01)
*F02K 3/06* (2006.01)
(Continued)

(52) U.S. Cl.
CPC ............. *F01D 9/065* (2013.01); *F01D 5/185* (2013.01); *F01D 9/041* (2013.01); *F01D 9/042* (2013.01);
(Continued)

(58) Field of Classification Search
CPC .......... F01D 5/185; F01D 9/065; F01D 9/041; F01D 9/042; F01D 5/187; Y02T 50/676;
(Continued)

(56) References Cited

U.S. PATENT DOCUMENTS 2,977,090 A * 3/1961 McCarty ................... F01D 5/18
416/96 R
4,190,398 A * 2/1980 Corsmeier ................ F01D 5/18
415/114
(Continued)

FOREIGN PATENT DOCUMENTS

FR  2 989 110 A1  10/2013
FR  3 028 576 A1   5/2016

OTHER PUBLICATIONS

Search Report issued in French Patent Application No. 1656904 dated Jun. 16, 2017.

*Primary Examiner* — Igor Kershteyn
*Assistant Examiner* — Andrew Thanh Bui
(74) *Attorney, Agent, or Firm* — Pearne & Gordon LLP (57) ABSTRACT

The invention relates to an intermediate case (25) for a twin spool turbomachine for an aircraft, comprising a hub (26), an outer shell (23) and outlet guide vanes (24) installed at their ends on the hub and on the outer shell, and each of at least some of the outlet guide vanes (24) performing a heat exchanger function and comprising a lubricant passage (50*a*, 50*b*) designed to be cooled by the fan flow (58) following an outer surface of the outlet guide vane. According to the invention, the case also comprises at least one lubricant duct (55) passing along a circumferential direction of the hub (26) and at least part of which is made from a single casting with the hub, the lubricant duct (55) having at least one lateral opening communicating with the lubricant passage (50*a*, 50*b*) of at least one of the vanes (24).

9 Claims, 5 Drawing Sheets

(51) Int. Cl.
  *F02C 7/18* (2006.01)
  *F01D 5/18* (2006.01)
  *F01D 9/04* (2006.01)
  *F01D 25/12* (2006.01)
  *F01D 25/18* (2006.01)
  *F02C 7/16* (2006.01)
  *F28D 21/00* (2006.01)

(52) U.S. Cl.
  CPC ............ *F01D 25/12* (2013.01); *F01D 25/18* (2013.01); *F02C 7/16* (2013.01); *F02C 7/18* (2013.01); *F02K 3/06* (2013.01); *F05D 2220/32* (2013.01); *F05D 2230/25* (2013.01); *F05D 2230/53* (2013.01); *F05D 2240/12* (2013.01); *F05D 2260/205* (2013.01); *F05D 2260/208* (2013.01); *F05D 2260/213* (2013.01); *F05D 2260/98* (2013.01); *F28D 2021/0089* (2013.01); *Y02T 50/60* (2013.01)

(58) Field of Classification Search
  CPC ........... F05D 2260/98; F05D 2260/208; F05D 2230/53; F05D 2230/25; F05D 2260/205; F05D 2260/213; F05D 2260/20; F05D 2230/21
  See application file for complete search history.

(56) References Cited

U.S. PATENT DOCUMENTS

| | | | | |
|---|---|---|---|---|
| 5,222,360 | A * | 6/1993 | Antuna | B64D 27/18 415/209.2 |
| 6,860,716 | B2 * | 3/2005 | Czachor | F01D 25/162 415/142 |
| 7,377,098 | B2 * | 5/2008 | Walker | F01D 9/065 184/6.11 |
| 8,371,812 | B2 * | 2/2013 | Manteiga | F01D 25/28 415/209.3 |
| 8,616,834 | B2 * | 12/2013 | Knight, III | F01D 5/18 415/116 |
| 9,920,643 | B2 * | 3/2018 | Manzoori | F02C 7/18 |
| 10,260,523 | B2 * | 4/2019 | Snyder | F02C 7/06 |
| 10,364,691 | B2 * | 7/2019 | Curlier | F01D 15/10 |
| 2006/0042223 | A1 * | 3/2006 | Walker | F01D 9/065 60/39.08 |
| 2010/0236215 | A1 | 9/2010 | Srinivasan | |
| 2012/0243970 | A1 * | 9/2012 | Hellgren | F01K 27/02 415/1 |
| 2015/0260045 | A1 | 9/2015 | Chartir | |
| 2017/0159489 | A1 * | 6/2017 | Sennoun | F02C 7/185 |
| 2017/0204879 | A1 * | 7/2017 | Zaccardi | F01D 9/065 |

* cited by examiner

INTERMEDIATE CASE FOR AN AIRCRAFT TURBOMACHINE MADE FROM A SINGLE CASTING WITH A LUBRICANT DUCT

TECHNICAL DOMAIN

This invention relates to the field of twin-spool turbomachines for aircraft, and particularly the design of the intermediate case integrating outlet guide vanes formed in the fan air stream of the turbomachine. Such "Outlet Guide Vanes" (OGV) are designed to straighten the air flow at the outlet from the fan.

STATE OF PRIOR ART

On some twin-spool turbomachines, it is known that outlet guide vanes can be installed at the exit from the fan to straighten the outlet flow from the fan, and possibly also to perform a structural function. This function is intended to transfer forces from the centre of the turbomachine to an outer shell located along the prolongation of the fan case. In this case, an engine attachment is conventionally formed on or close to this outer shell, to form the attachment between the turbomachine and an attachment pylon for the aircraft.

It was also recently disclosed that the outlet guide vanes can be expected to perform an additional function. This is a heat exchange function between the outside air passing through the ring of outlet guide vanes, and lubricant circulating inside these vanes. This heat exchange function is for example known as disclosed in document U.S. Pat. No. 8,616,834, or document FR 2 989 110.

Lubricant to be cooled by the outlet guide vanes can originate from different zones of the turbomachine. It can be a lubricant circulating through lubrication chambers of roller bearings supporting engine shafts and/or the fan hub, or a lubricant used for lubrication of mechanical transmission elements of the Accessory Gear Box (AGB). Finally, it can also be used for lubrication of a fan drive reduction gearbox, when such a reduction gearbox is provided on the turbomachine to reduce the rotation speed of its fan.

Increasing lubricant needs require that the heat dissipation capacity should be adapted accordingly, associated with exchangers designed for cooling the lubricant. The fact that a role of heat exchanger is assigned to the outlet guide vanes, as in the solutions in the two documents mentioned above, can in particular reduce or even eliminate conventional Air Cooled Oil Cooler (ACOC) type exchangers. Since these ACOC exchangers are generally formed in the fan flow path, reducing or eliminating them can limit disturbances in the fan flow and thus increase the global efficiency of the turbomachine.

The fact that a heat exchange function is associated with at least some of these vanes means that lubricant inlet and/or outlet ducts have to be provided, particularly in the hub of the intermediate case. However, this environment is already highly congested by the presence of other auxiliaries, and the installation of lubricant ducts and their fluid connections to the vanes is difficult. This problem is particularly severe when the outlet guide vanes are connected close to the flow splitter, in a narrow zone in which the space available in the hub is very limited.

DISCLOSURE OF THE INVENTION

The first purpose of the invention to at least partly solve this problem is an intermediate case for a twin spool turbomachine for an aircraft, comprising a hub, an outer shell and outlet guide vanes installed at their ends on the hub and on the outer shell, and each of at least some of said outlet guide vanes performing a heat exchanger function and comprising a lubricant passage designed to be cooled by the fan flow following an outer surface of the outlet guide vane.

According to the invention, the case also comprises at least one lubricant duct passing along a circumferential direction of the hub and at least part of which is made from a single casting with said hub, said duct having at least one lateral opening communicating with said lubricant passage of at least one of the outlet guide vanes.

As a result of this design made in a single piece with the hub, the layout of the lubricant duct(s) is simplified and is more compatible with the restricted environment in which they have to be formed, to cooperate with the outlet guide vanes performing a heat exchanger function.

The invention also has at least one of the following optional characteristics, taken in isolation or in combination.

The entire lubricant duct is made of a single casting with said hub.

Alternatively, only part of the lubricant duct is made in a single casting with said hub, this part (called the integrated part) being closed by an end plate to complete said lubricant duct. This alternative can facilitate elimination of the foundry core used to form the duct.

In this alternative, it is preferably arranged that said integrated part is open radially outwards, and/or that the end plate integrates said at least one lateral opening. Alternatively, it would also be possible to have an integrated part open in a direction other than the radial direction, with this integrated part equipped with one or more lateral openings for fluid communication with the vane lubricant passage.

According to one possibility, at least one seal is provided for each lateral opening in the lubricant duct, loaded in the radial direction from a central axis of this opening, between a first end piece of one of the outlet guide vanes and a second end piece of the lubricant duct defining said opening, said first end piece being inserted in the second end piece, or vice versa. Cooperation of these end pieces enables simple fluid coupling. Furthermore, this fluid coupling can advantageously be used to preposition the vane relative to the hub, before machining operations after assembly to reduce the static indeterminacy of assembly. Finally, the risk of a leak is limited due to the reduction in the number of fluid interfaces between the different components.

According to another possibility, at least one seal is provided for each lateral opening in the lubricant duct, loaded along the axial direction of the central axis of this opening, between a first end piece of one of the outlet guide vanes and a second end piece of the lubricant duct defining said opening, said first and second end pieces being forced into contact with each other along the direction of the central axis. With this solution, disassembly under the blade of the vane can also be envisaged, simplifying maintenance operations.

Regardless of which embodiment is envisaged, the root of each outlet guide vane is preferably provided with firstly holes on the upstream side for attachment to the hub formed close to a leading edge, and holes on the downstream side for attachment to the hub formed close to a trailing edge. Nevertheless, other arrangements of attachment holes can be envisaged without going outside the framework of the invention.

Preferably, the first end piece of the outlet guide vane is formed between the upstream and downstream vane attachment holes.

Another purpose of the invention is a twin spool turbomachine for an aircraft, comprising an intermediate case as described above and located downstream from a fan of this turbomachine.

Finally, another purpose of the invention is a method of assembly of such an intermediate case, comprising the following steps:

prepositioning of at least one of the outlet guide vanes relative to the hub, by inserting the first end piece into the second end piece or vice versa;

machining of the attachment holes in the prepositioned outlet guide vane; and attachment of the outlet guide vane on the hub using attachment elements passing through said attachment holes.

As mentioned above, this method of proceeding reduces the static indeterminacy of the assembly between the vane and the hub of the intermediate case. In addition to simplifying the assembly, this reduces stresses in the vane. This advantage is particularly useful when the outlet guide vane also performs a structural function.

Other advantages and characteristics of the invention will become clear after reading the following non-limitative detailed description.

BRIEF DESCRIPTION OF THE DRAWINGS

This description will be made with reference to the appended drawings among which.

DETAILED DESCRIPTION OF PREFERRED EMBODIMENTS

Figure 1:
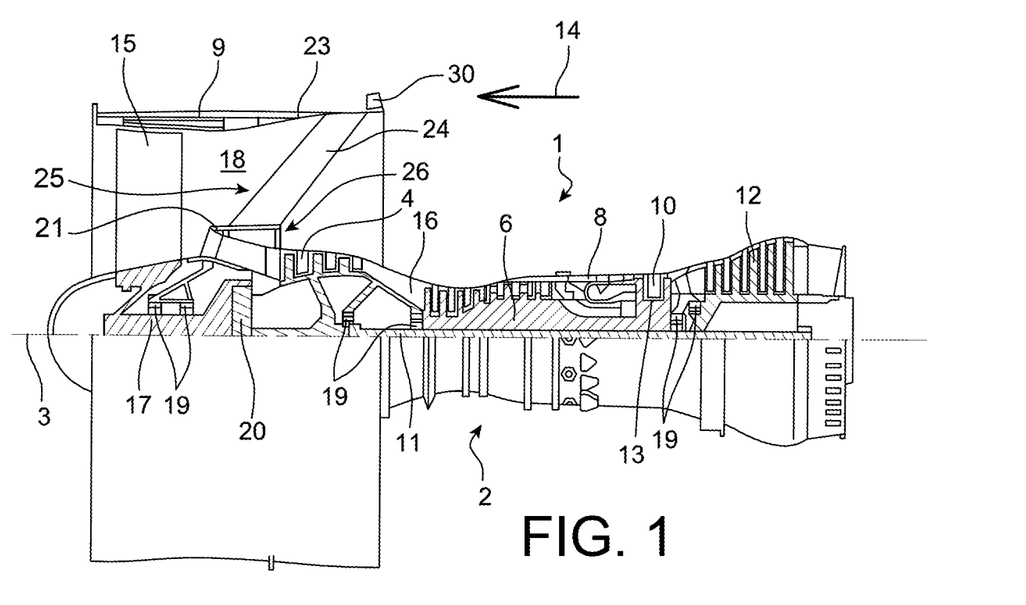
FIG. 1 diagrammatically represents a side view of a turbojet according to the invention.

With reference to FIG. 1, the figure represents a twin-flow twin-spool turbojet, for example with a high dilution ratio. The turbojet 1 conventionally comprises a gas generator 2 with a low pressure compressor 4 on one side and a low pressure turbine 12 on the other side, this gas generator 2 comprising a high pressure compressor 6, a combustion chamber 8 and a high pressure turbine 10. In the following, the terms "forward from" and "aft from" are considered along a direction 14 opposite to the main flow direction of gases in the turbojet, this direction 14 being parallel to the longitudinal axis 3 of the turbojet. On the other hand, the terms "upstream" and "downstream" are considered along the main flow direction of gases within the turbojet.

The low pressure compressor 4 and the low pressure turbine 12 form a low pressure case, and are connected to each other through a low pressure shaft 11 centred on the axis 3. Similarly, the high pressure compressor 6 and the high pressure turbine 10 form a high pressure case, and are connected to each other through a high pressure shaft 13 centred on the axis 3 and arranged around the low pressure shaft 11. The shafts are supported by bearing blocks 19 that are lubricated by being located in oil chambers. The same applies for the fan hub 17, also supported by roller bearings 19.

The turbojet 1 also comprises a single fan 15 located forward from the gas generator 2 and the low pressure compressor 4, in this case a single fan 15 that is located directed aft from the engine nose dome. The fan 15 rotates about the axis 3, and is surrounded by a fan case 9. On FIG. 1, it is not driven by the low pressure shaft 11 directly, but is only driven by this shaft indirectly through a reduction gear 20, so that it can rotate at a lower speed. Nevertheless, a direct drive solution for the fan 15, by the low pressure shaft 11, is within the scope of the invention.

Furthermore, the turbojet 1 defines a core path 16 through which a core flow will pass, and a fan path 18 through which a fan flow will pass and that is radially outside the core flow, therefore the fan flow being separated at a flow splitter 21. As is well known to an expert in the subject, the fan flow 18 is delimited radially externally partly by an outer shell 23, preferably metallic, prolonging the fan case 9 in the aft direction. As will be described below, this is the outer shell 23 of an intermediate case 25 downstream from the flow splitter 21.

Although not shown, the turbojet 1 is equipped with a set of equipment, for example such as a fuel pump, a hydraulic pump, alternator, starter, variable stator vane (VSV), discharge valve actuator, or electrical power generator. In particular, there is equipment for lubrication of the reduction gear 20. This equipment is driven by an accessories gear box (AGB) (not shown) that is also lubricated.

There is a ring of outlet guide vanes 24 (OGV) in the fan flow 18, downstream from the fan 15. These stator vanes 24 connect the outer shell 23 to a hub 26 of the intermediate case that is thus composed of the outer shell 23, the outlet guide vanes 24 and the hub 26 located in the downstream prolongation of the flow splitter 21.

The vanes 24 are circumferentially spaced from each other to straighten the fan flow after it has passed through the fan 15. Furthermore, these vanes 24 can also perform a structural function, as is the case in the example embodiments described above. They transfer forces from the reduction gear and roller bearings 19 of the engine shafts and the fan hub, to the outer shell 23. These forces can then transit through an engine attachment 30 fixed onto the shell 23 connecting the turbojet to an attachment pylon (not shown) of the aircraft.

Finally, in the example embodiments described herein, the outlet guide vanes 24 perform a third heat exchange function between the fan flow passing through the ring of vanes, and the lubricant circulating inside these vanes 24. The lubricant that will be cooled by the outlet guide vanes 24 is the lubricant that lubricated the roller bearings 19, and/or the turbojet equipment, and/or the accessories gearbox, and/or the reduction gear 20. These vanes 24 thus form part of the fluid circuit(s) in which lubricant is circulated to lubricate the associated elements successively, and then to be cooled.

This function is shown schematically on FIG. 2 that only shows one of the vanes 24, but it must be understood that the invention as it will be described below can apply to all the vanes 24 in the stator ring centred on the axis 3, or only to some of these vanes.

Figure 2:
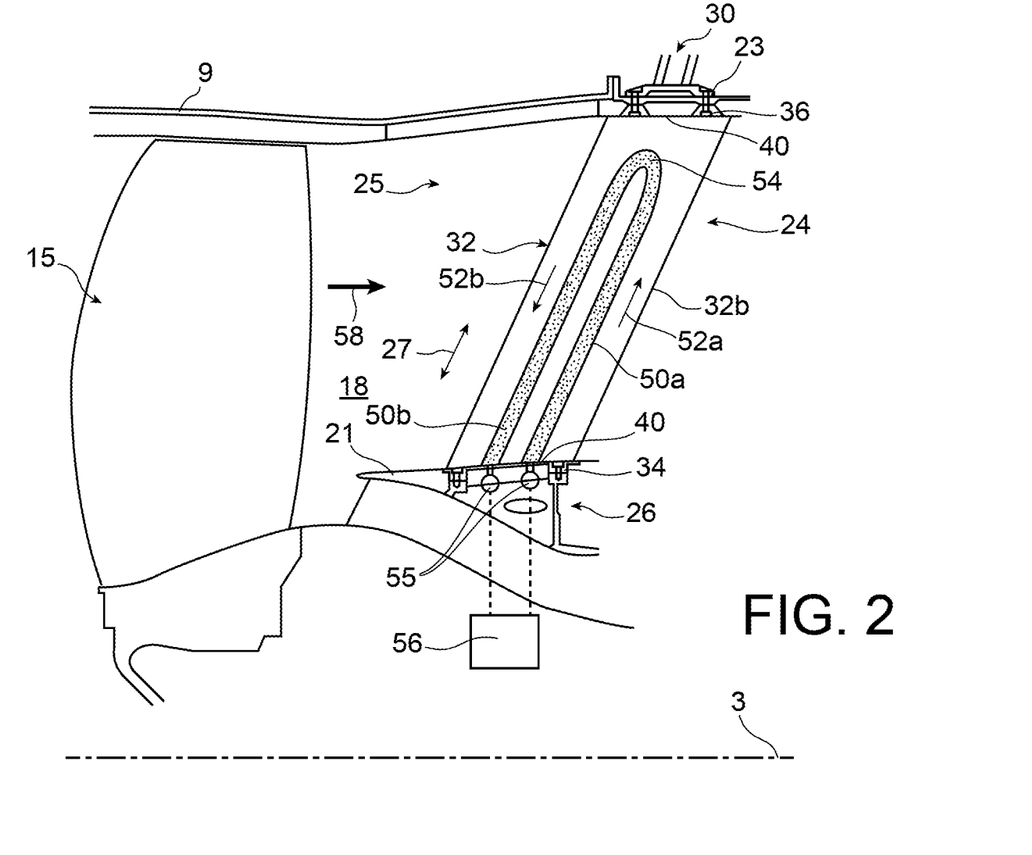
FIG. 2 represents a more detailed enlarged view of a part of the fan and the intermediate case shown on the previous figure, according to a first preferred embodiment of the invention.

The vane 24 may be oriented precisely along the radial direction, or preferably it can be inclined in the axial direction as shown on FIG. 2. In all cases, it is preferably straight when viewed from the side as shown on FIG. 2, and extends along a direction of the width 27.

The outlet guide vane 24 comprises an aerodynamic part 32 that corresponds to its central part, in other words the part exposed to the fan flow. It has a leading edge 32a and a trailing edge 32b. The vane 24 comprises a root 34 on one side of this aerodynamic part 32 that straightens the outlet flow from the fan, and a head 36 on the other side.

The root 34 is used to fix the vane 24 to the hub 26 as will be described in detail below, while the head is used to fix this vane onto the outer shell 23 prolonging the fan case 9. Furthermore, platforms 40 are formed at the root and the head of the vane, so as to reconstitute the fan flow between the vanes 24.

In the first embodiment shown in this FIG. 2, the aerodynamic part 32 is equipped with two inner lubricant passages 50a, 50b approximately parallel to each other and parallel to the direction of the width 25. As will be described in detail below, at least one of the vanes has two lubricant passages through which fluid circulates in opposite directions, and each passage communicates with a distinct duct. The supply-return flow of lubricant in the vane is advantageous for the passage of this lubricant in the ducts located in the hub approximately around 360 degrees, under the radially inner platforms of the fan flow, for better synergy, compactness and for easy assembly.

More precisely, a first lubricant passage 50a extends along a first main flow direction 52a of the lubricant. This direction 52a is approximately parallel to the direction of the width 25, along the direction from the root 34 towards the head 36. Similarly, there is a second lubricant passage 50b that extends along a second main flow direction 52b of the lubricant, within this passage. This direction 52b is also approximately parallel to the direction of the width 25, along the opposite direction from the head 36 towards the root 34. The outer radial ends of the two passages 50a, 50b are provided with a fluid connection passing through one or several 180° bends 54, corresponding to a hollow formed in the aerodynamic part 32, to connect one passage to the other. Nevertheless, several fluid supply-return ducts can be formed with the vane, without going outside the framework of the invention.

Alternatively, the flow directions could be inverted. It is also possible to provide two independent lubricant passages inside the vane, not connected to each other inside the vane. According to yet another possibility, the vane may be provided with a single lubricant passage, for flow in one direction or the other.

Returning to the embodiment shown in FIG. 2, note that the inner radial ends of the two passages 50a, 50b communicate with lubricant ducts 55 integrated into the hub 26 of the intermediate case. These ducts 55 form part of a lubricant circuit shown diagrammatically by element 56 on FIG. 2. In particular, this circuit 56 comprises a pump (not shown), that imposes the required circulation direction on the lubricant through the passages 50a, 50b, namely to introduce lubricant through the inner radial end of the first passage 50a, and to extract lubricant through the inner radial end of the second passage 50b.

Thus, during operation of the turbomachine, lubricant is introduced into the first inner passage 50a along the first radially outwards direction 52a. The lubricant temperature at this stage is high. Heat exchange then takes place between this lubricant and the fan flow 58 following the outer surface of the aerodynamic part 32 of the vane. After having been redirected by the bend 54 into the second passage 50b, it is similarly cooled in this passage, still by heat exchange with the fan flow 58, while circulating along the second main flow direction 52b. The cooled lubricant is then extracted from the vane 24, and directed by the closed circuit 56 towards the elements to be lubricated, after passing through the pipes 55.

Figure 3:
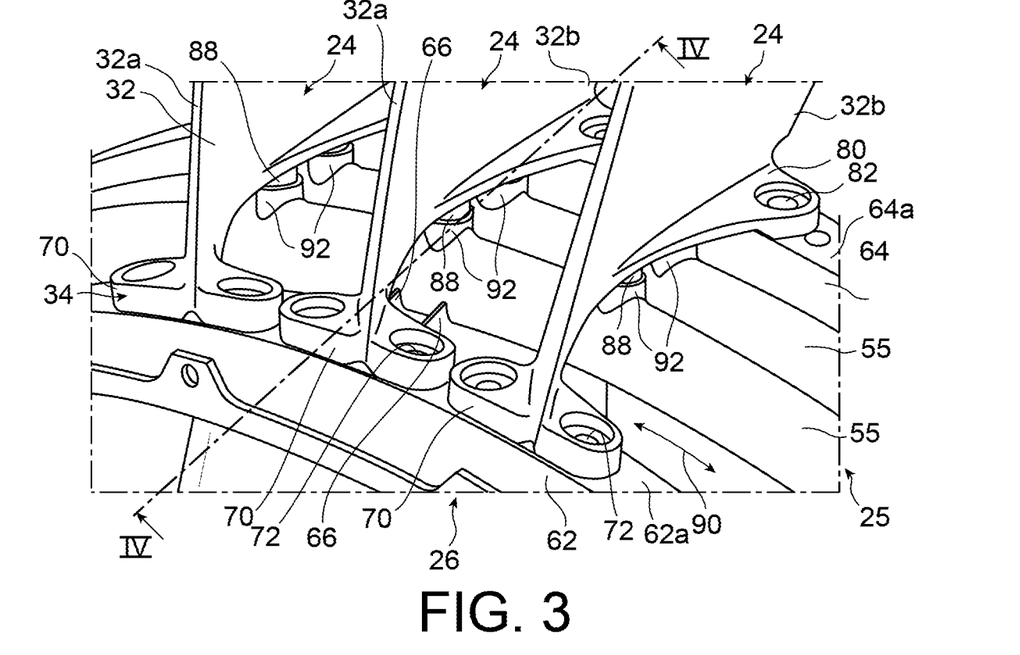
FIG. 3 is an enlarged perspective view of the hub of the intermediate case shown on the previous figure.
Figure 4:
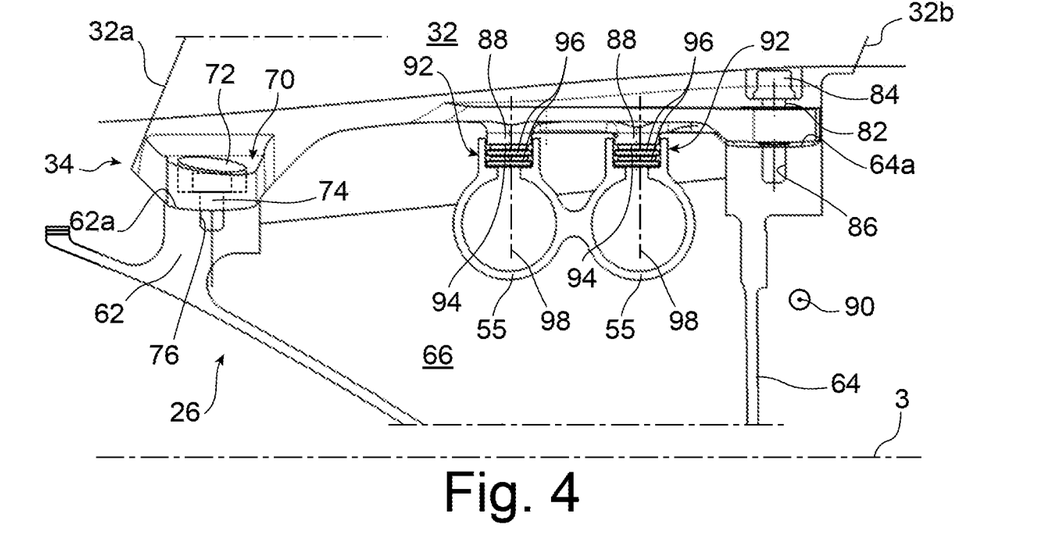
FIG. 4 is a cross-sectional view taken along line IV-IV in FIG. 3.

We will now give a more detailed description of the hub 26 of the intermediate case and its cooperation with the vanes 24, with reference to FIGS. 2 to 4.

The hub 26 comprises an upstream end plate 62 and a downstream end plate 64 centred on the centre line 3 and connected to each other by radial arms 66. Each end plate terminates radially outwards by a track 62a, 64a to which the outlet guide vanes 24 are fixed. In this respect, each vane comprises an upstream attachment plate 70 at its root 34 close to the leading edge 32a, in which upstream attachment holes 72, are formed, for example two holes through which screw type attachment elements 74 pass. Thus, the screws 74 pass through the upstream attachment holes 72 and are screwed into the threaded holes 76 of the track 62a, so as to hold the plate 70 in contact on the track. Similarly, each vane comprises a downstream attachment plate 80 at its root 34 and close to the trailing edge 34 through which downstream attachment holes 82 are drilled, for example two holes through which screw type attachment elements 84 pass. Thus, the screws 84 pass through the downstream attachment holes 82 and screw into the threaded holes 86 of the track 62b, so as to hold the plate 80 on the track.

The plates 70, 80 are preferably made from a single piece with the aerodynamic part of the vane, like the first end pieces 88 used for fluid communication with the pipes 55. These first end pieces 88 project inwards from the aerodynamic part 32, being located half way between the plates 70, 80.

Therefore these two end pieces 88 cooperate with two lubricant ducts 55, each routed along a circumferential direction 90 of the hub 26. Each duct 55 extends in an annular configuration around an angular sector of approximately 360°. In this respect, note that each duct can be interrupted or it can be continuous around 360°. For example, it would be possible for each duct 55 to be made using two 180° segments, or four 90° segments. This forms one duct for the fluid inlet, and another duct for the fluid outlet.

Each duct is arranged between the two end plates 62, 64, supported on the outer radial end of the arms 66. Therefore the two pipes 55 are practically parallel, and are connected at one of their ends to the remainder of the hydraulic circuit.

As mentioned above, one of the special features of the invention lies in the fact that at least part of each lubricant duct 55 is made from a single casting part with the hub 26. In this first preferred embodiment, each entire duct 55 is made from a single piece with the hub. This embodiment is made by placing a core in the hub fabrication mould, that is then removed to leave empty space inside the ducts.

One of the ducts 55 will carry hot lubricant into the vanes 24, while the other duct will collect cold lubricant at the outlet from the vane. Each duct 55, centred on the centre line 3, thus has second end pieces 92 each of which will cooperate with one of the first end pieces 88 of the vanes 24. These second end pieces 92 form an integral art of the duct 55, and are therefore made from the same casting.

The first end piece 88 is inserted into the second end piece 92 with a larger diameter, and a lateral opening 94 defined by the second end piece 92 enables fluid communication with the first end piece 88 in which there is a similar opening communicating with lubricant passages in the vane. The opening 94 is said to be lateral, in the sense that it is formed on the lateral surface of the duct, and not on its axial ends. Note that the opening may for example be radial from the duct centre line.

Furthermore, the second end piece 92 extends radially outwards, even if an axial inclination may be applied, without going outside the framework of the invention.

It is planned to seal the connection between each pair of end pieces 88, 92, by providing an O-ring type seal 96 stressed radially from a centre line 98 of the associated lateral opening 94, between the first and the second end pieces 88, 92. The seals 96 may be carried on either of the two end pieces.

This design makes it possible to use a simple assembly method for the intermediate case 25 that will be described with reference to FIGS. 5*a* and 5*b*.

Firstly, even before the attachment holes are drilled in the attachment plates, each vane 24 concerned is prepositioned relative to the hub 26, by inserting the first end pieces 88 in the second end pieces 92. The seals 96 are radially compressed relative to the central axis 98, and the vane may thus be held in place temporarily, with its undrilled plates 70, 80 bearing on the corresponding tracks 62*a*, 62*b*.

Figure 5A:
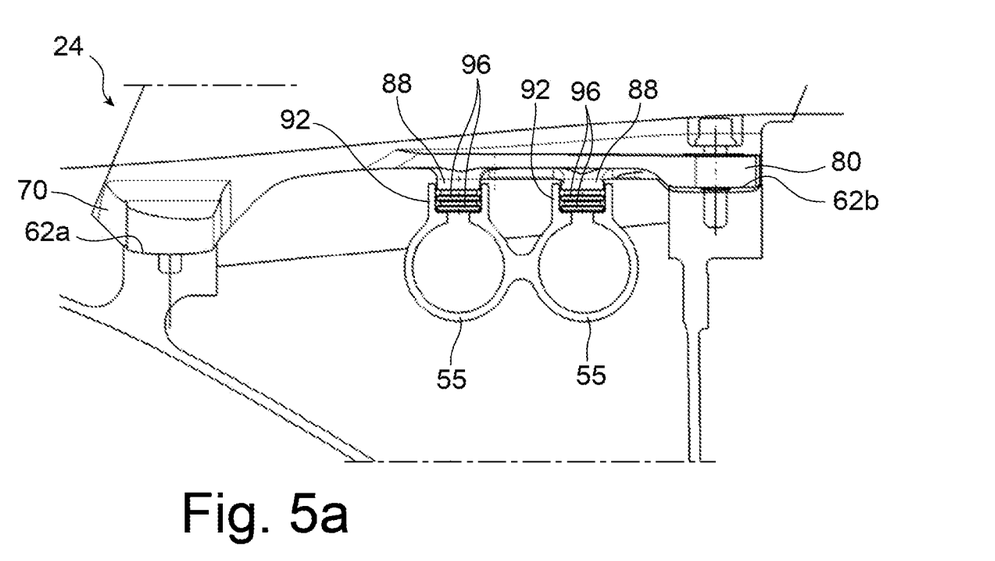
FIGS. 5a to 5b represent different steps in a method of assembling the intermediate case shown on the previous figures.
Figure 5B:
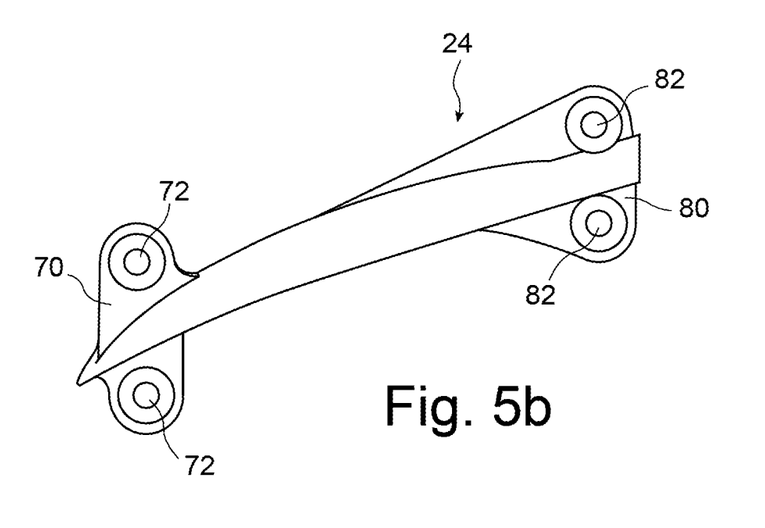

Once this state shown on FIG. 5*a* is reached, the attachment holes 72, 82 are then formed on the assembly so as to limit static indeterminacy in the assembly of the vane. Therefore, the four holes 72, 82 shown in FIG. 5*b* are machined, for example by providing an adjusted hole 82, a fitted adjusted hole 72, and two other holes 72, 82 with larger machining tolerances forming passage holes.

Once the holes have been made, the vane attachment is completed by installing the screws 74, 84 in the corresponding holes.

Thick seals 96 can also be provided to limit static indeterminacy of the assembly without needing to machine attachment holes on the assembly; which fills in clearances during assembly of the plates 70, 80.

Figure 6:
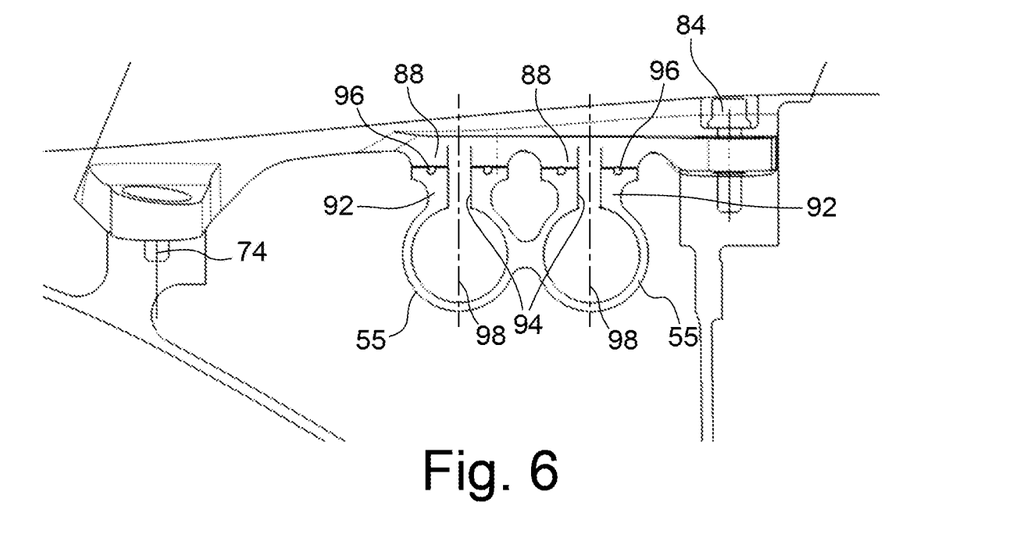
FIGS. 6 to 8 represent views similar to the view in FIG. 4, with the intermediate case in the form of second, third and fourth preferred embodiments of the invention respectively.

According to a second embodiment shown on FIG. 6, the end pieces 88, 92 are no longer inserted in each other, but are forced into contact with each other along the direction of the central axis 98 of the opening 94. The seal 96 is then also loaded axially along this direction, by being placed flat between the two end pieces 88, 92.

Figure 7:
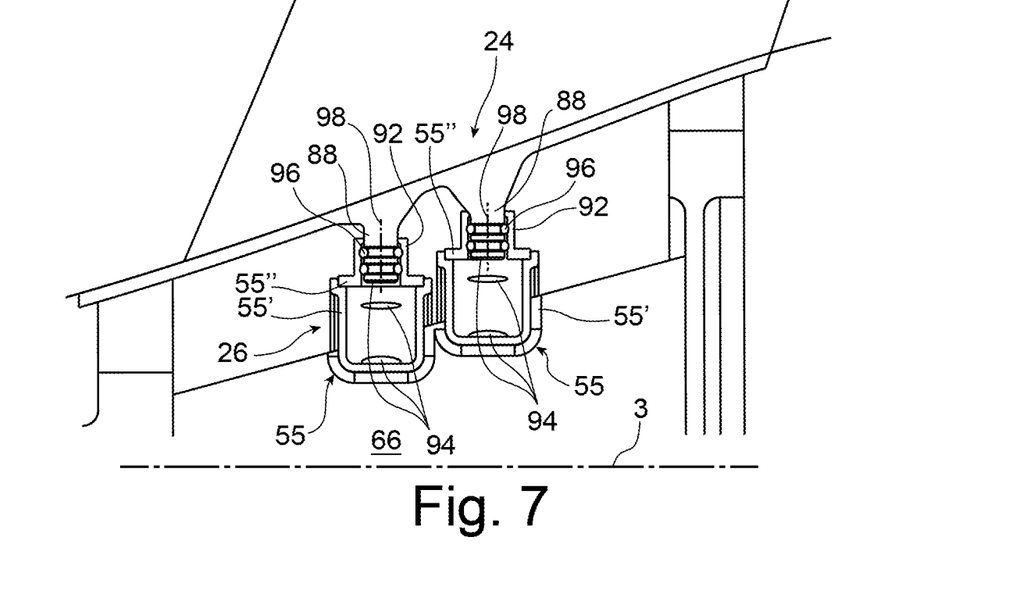

According to a third embodiment shown on FIG. 7, only some of each lubricant duct 55 is made in a single casting with the intermediate case 25, and only part of each duct called the integrated part 55' is made. In this preferred third embodiment, the integrated part 55' extends around the entire angular sector of the duct, while remaining open radially outwards, from the axis 3. In section, it is the form of a U open in the radial direction, and closed off by a plate 55" including the second end pieces 92 and openings 94 defined by these end pieces.

The closing plate 55" can be attached to the integrated part 55' by welding, by brazing, by screwed or bolted assembly, by gluing or by any other method considered to be appropriate.

Figure 8:
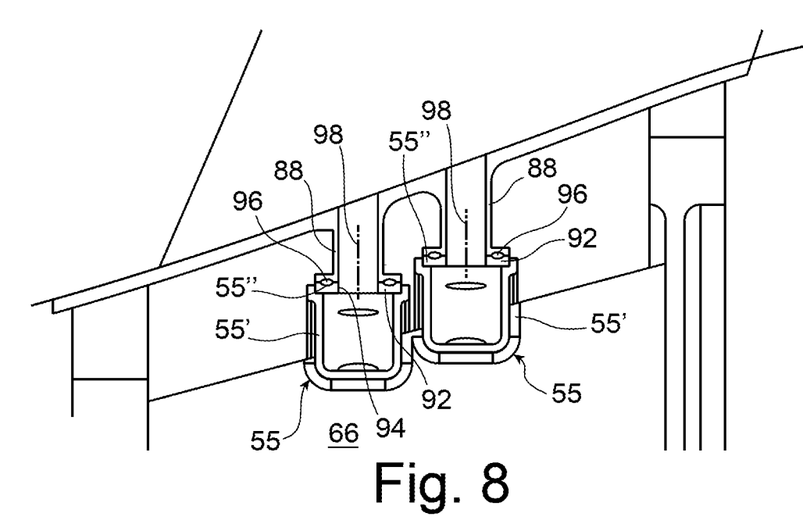

Finally, the fourth embodiment shown on FIG. 8 is similar to the third embodiment in FIG. 7, except in that the end pieces 88, 92 are not inserted one into the other, but are forced into contact in pairs along the central axis 98 as described for the second embodiment in FIG. 6. Nevertheless, it is noted that in this fourth embodiment, the second end pieces 92 can be flat and can have the same thickness as the remaining part of the closing pate 55".

Obviously, an expert in the subject can make various modifications to the invention that has just been described solely as non-limitative examples. In particular, the technical characteristics specific to each embodiment described above can be combined together without going outside the framework of the invention.

The invention claimed is:

1. An intermediate case for a twin spool turbomachine for an aircraft, comprising a hub, an outer shell and outlet guide vanes removably mounted at their ends on the hub and on the outer shell, and each of at least some of said outlet guide vanes performing a heat exchanger function and comprising a lubricant passage designed to be cooled by a fan flow following an outer surface of the outlet guide vane, wherein the intermediate case also comprises at least one lubricant duct passing along a circumferential direction of the hub and at least part of which is made from a single casting with said hub, wherein each outlet guide vane comprises holes through which attachment elements pass to fix said outlet guide vane to the hub, wherein said lubricant duct has at least three lateral openings spaced relative to one another along the circumferential direction, and respectively communicating with said lubricant passage of at least three of the outlet guide vanes, and wherein each lubricant duct extends in an annular configuration around an angular sector of approximately 360°.

2. The intermediate case according to claim 1, wherein the entire lubricant duct is made of a single casting with said hub.

3. The intermediate case according to claim 1, wherein only part of the lubricant duct is made in a single casting with said hub, said part of the lubricant duct being closed by an end plate to complete said lubricant duct.

4. The intermediate case according to claim 3, wherein said integrated part is open radially outwards, and/or that the end plate integrates said at least one lateral opening.

5. The intermediate case according to claim 1, wherein a first end piece is provided at one of the outlet guide vanes and a second end piece is provided at the lubricant duct and defines the lateral opening, the first end piece being inserted in the second end piece, or vice versa, and wherein at least one seal is provided for each lateral opening in the lubricant duct, loaded in the radial direction from a central axis of this opening, between the first end piece and the second end piece.

6. The intermediate case according to claim 1, wherein at least one seal is provided for each lateral opening in the lubricant duct, loaded along the axial direction of a central axis of this opening, between a first end piece of one of the outlet guide vanes and a second end piece of the lubricant duct defining said opening, said first and second end pieces being forced into contact with each other along the direction of the central axis.

7. The intermediate case according to claim 1, wherein said holes of each outlet guide vane includes first holes and second holes, and wherein the root of each outlet guide vane is provided with the first holes on the upstream side for attachment to the hub formed closer to a leading edge than to a trailing edge, and the second holes on the downstream side for attachment to the hub formed closer to the trailing edge than to the leading edge.

8. The intermediate case according to claim 5, wherein said holes of each outlet guide vane includes first holes and second holes, and wherein the root of each outlet guide vane is provided with the first holes on the upstream side for attachment to the hub formed close to a leading edge, and the second holes on the downstream side for attachment to the hub formed close to a trailing edge, and in that the first end piece of the outlet guide vane is formed between the upstream and downstream vane attachment holes.

9. A twin spool turbomachine for an aircraft, comprising the intermediate case according to claim 1, located downstream from a fan of this turbomachine.

\* \* \* \* \*